(12) United States Patent
Yasunaga

(10) Patent No.: US 7,359,133 B2
(45) Date of Patent: Apr. 15, 2008

(54) MAGNETIC RECORDING MEDIUM AND DRIVE APPARATUS THEREFOR

(75) Inventor: Tadashi Yasunaga, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

(21) Appl. No.: 10/167,498

(22) Filed: Jun. 13, 2002

(65) Prior Publication Data

US 2002/0191317 A1 Dec. 19, 2002

(30) Foreign Application Priority Data

Jun. 15, 2001 (JP) ............................. 2001-181360

(51) Int. Cl.
*G11B 5/09* (2006.01)

(52) U.S. Cl. ....................................................... 360/48

(58) Field of Classification Search ................ 360/76, 360/48, 15, 16, 17, 77.05
See application file for complete search history.

(56) References Cited

U.S. PATENT DOCUMENTS

| | | | |
|---|---|---|---|
| 4,551,777 A | | 11/1985 | Saito et al. |
| 4,642,709 A | * | 2/1987 | Vinal ........................ 360/77.05 |
| 4,935,830 A | * | 6/1990 | Hiraoka et al. ............. 360/128 |
| 5,339,207 A | * | 8/1994 | Moon et al. .............. 360/77.05 |
| 5,341,255 A | | 8/1994 | Starr et al. |
| 5,465,183 A | * | 11/1995 | Hattori ..................... 360/78.09 |
| 5,689,384 A | * | 11/1997 | Albrecht et al. .......... 360/77.12 |
| 5,694,265 A | * | 12/1997 | Kosugi et al. ............ 360/77.05 |
| 5,828,536 A | * | 10/1998 | Morita ........................ 360/135 |
| 5,901,003 A | * | 5/1999 | Chainer et al. ................ 360/51 |
| 5,903,411 A | * | 5/1999 | Tomita et al. ............. 360/78.14 |
| 6,016,547 A | * | 1/2000 | Ono ............................ 711/100 |
| 6,055,139 A | | 4/2000 | Ohtsuka et al. |
| 6,324,032 B1 | | 11/2001 | Ohtsuka et al. |
| 6,347,016 B1 | | 2/2002 | Ishida et al. |
| 6,388,833 B1 | * | 5/2002 | Golowka et al. ......... 360/77.02 |
| 6,426,844 B1 | * | 7/2002 | Anderson et al. ........ 360/77.08 |
| 6,493,174 B1 | * | 12/2002 | Stubbs ..................... 360/77.12 |
| 6,798,596 B2 | * | 9/2004 | Lim et al. ..................... 360/53 |

FOREIGN PATENT DOCUMENTS

| | | |
|---|---|---|
| EP | 0 690 442 A2 | 1/1996 |
| JP | 58-035769 A | 3/1983 |
| JP | 61085602 A * | 5/1986 |
| JP | 63-098820 A | 4/1988 |
| JP | 63-183623 | 7/1988 |
| JP | 63-183623 A | 7/1988 |
| JP | 10-40544 | 2/1998 |
| JP | 10-083640 A | 3/1998 |
| JP | 10-269566 | 10/1998 |
| WO | WO 89/01685 A1 | 2/1989 |

\* cited by examiner

*Primary Examiner*—Andrea Wellington
*Assistant Examiner*—Dan I. Davidson
(74) *Attorney, Agent, or Firm*—Sughrue Mion, PLLC

(57) ABSTRACT

A flexible recording medium, which has a track width in the range of approximately 1-3 μm, capable of facilitating good tracking control. A magnetic pattern bearing servo signals is provided on the guard bands formed on both sides of a data track of a magnetic recording medium. An improvement in tracking control is achieved by performing the servo tracking in a continuous manner.

13 Claims, 6 Drawing Sheets

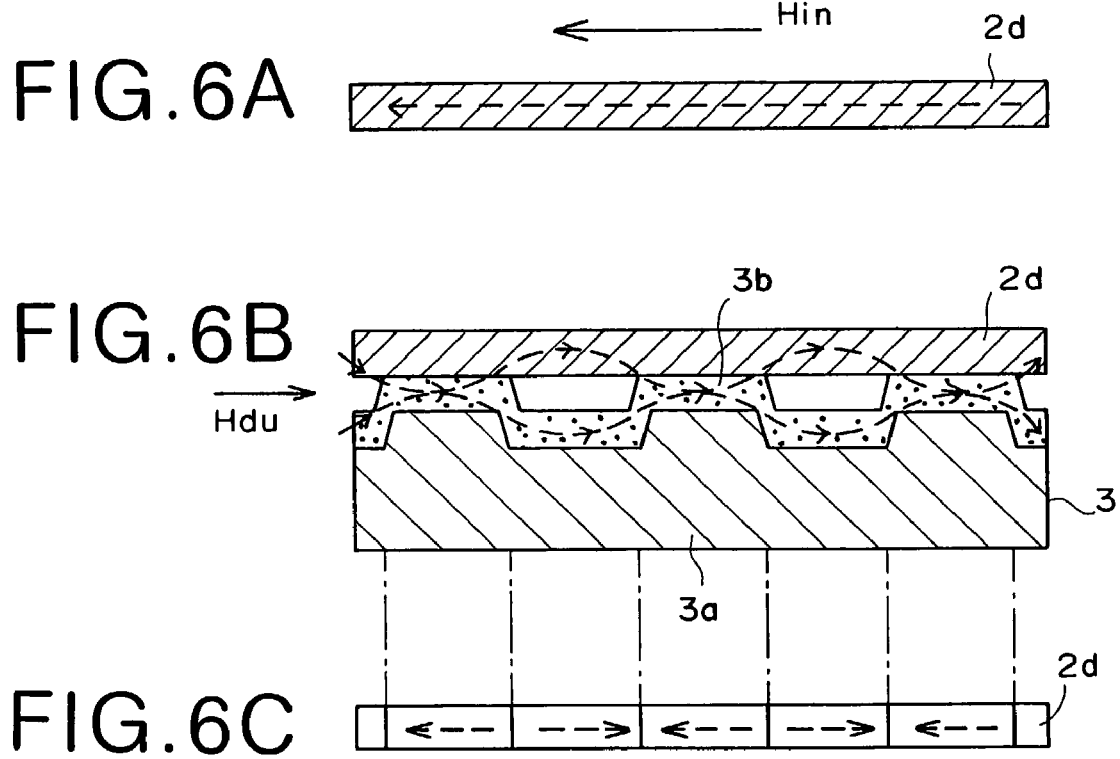

MAGNETIC RECORDING MEDIUM AND DRIVE APPARATUS THEREFOR

BACKGROUND OF THE INVENTION

1. Field of the Invention

The present invention relates to a magnetic recording medium, and in particular to a removable flexible magnetic recording medium provided with signals for servo tracking.

The present invention also relates to a drive apparatus for driving a magnetic recording medium.

2. Description of the Related Art

Generally speaking, with regard to magnetic storage mediums, there is a demand for increased storage capacity and low cost. Further desired are so-called high-speed access mediums, which are capable of advantageously reading out the data of a desired location in a short time. Examples of these high-density magnetic recording mediums include the magnetic recording mediums such as the conventional hard disks or flexible disks used in ZIP (Iomega) drives or the like. In comparison to floppy disks, the data recording region of a high-density recording medium such as that described above is provided with a narrower track. So-called tracking servo technology, wherein the magnetic head accurately scans the narrow width track, plays a substantial role in achieving a high S/N ratio. A conventional sector servo method is widely used for performing the tracking servo operation.

The sector servo method is a method wherein servo data such as the track positioning servo data, track address data signals, clock signals, and the like are recorded within servo fields distributed regularly at uniform angles over the data recording surface of the disk. A magnetic head scans these servo fields and reads out the servo data to confirm and correct its position. In general, a portion of the servo signal is recorded at a distance displaced by ½ the width of the track from the center line of said track, and the remaining components of the servo signal (i.e., the address data signals, clock signals and the like) are recorded on the center line of the track at an entire track pitch width. The data track width is narrower than the recording width of the servo signal, which encompasses the entire track width, and a guard band is formed on both sides of the data track.

The servo data must be "preformatted", that is, recorded on the magnetic recording medium in advance at the time of the manufacture thereof. Presently, servo recording apparatuses record servo signals on disks one track at a time, at a ½ track pitch. Therefore, a significant amount of time is required for the preformatting operation of one disk; whereby a problem exists from the standpoint of manufacturing efficiency.

On the other hand, magnetic transfer methods realizing accurate and efficient preformatting, wherein the data such as a servo signal or the like borne on a master medium is magnetically transferred therefrom to a magnetic recording medium, have been proposed in, for example, Japanese Unexamined Patent Publication Nos. 63(1988)-183623, 10(1998)-40544, and 10(1998)-269566.

According to these magnetic transfer technologies, a master medium having an uneven pattern provided with a magnetic layer on the surfaces of the protrusion portions thereof corresponding to the data that is to be transferred to a magnetic recording medium (a slave medium) is prepared. By bringing this master medium into close contact with a slave medium to form a conjoined body and applying a transfer magnetic field thereto, a magnetic pattern corresponding to the data (e.g., a servo signal) borne on the master medium is transferred to the slave medium. The preformatting can be performed without changing the relative positions of the master medium and the slave medium, that is, while the two media remain relatively static. Therefore not only is it possible to perform an accurate recording of the preformat data, it becomes possible to advantageously do so in an extremely short time.

At present, further increases in the data storage capacity of flexible disks magnetic recording mediums are sought. To this end, efforts to narrow the track width to less than 3 µm, or even less than 1 µm have been undertaken. In order to achieve such narrow track widths, improved magnetic recording mediums have been developed, and MR heads, PRML channels and the like have been employed to satisfy the record/playback properties of a magnetic recording medium having a narrow track width such as that described above. However, even with an elaborately well designed and stable HMI (head-medium interface), a flexible disk cannot avoid vertical media run-out on the order of 1-10 µm. With regard to the sector servo method, the position of the head is corrected within the servo fields, and the data regions between the servo fields are position control free regions. By further narrowing the track width, the size of the position control free region becomes relatively larger with respect to the servo field. Therefore, in a sector servo method having the conventional number of servo fields, it is difficult to achieve adequate tracking control (track following). Although it is possible to achieve an improvement in tracking control accuracy by increasing the number of servo fields, because data regions and servo fields are provided within the data track according to the sector servo method, a problem arises in that if the number of servo fields is increased, the data region is reduced.

SUMMARY OF THE INVENTION

The present invention has been developed in view of the forgoing circumstances, and it is an object of the present invention to provide a magnetic recording medium capable of facilitating good tracking control even if the track width thereof is narrow, and a drive apparatus for driving said magnetic recording medium.

The magnetic recording medium according to the present invention is a magnetic recording medium provided with a magnetic pattern which bears servo signals in the regions of the guard band adjoining the data regions bearing the recorded data.

Here, the referent of "guard band" is the band formed along the data tracks, which is formed between the data tracks and on both sides of each data track. Conventionally, the regions of the guard band adjoining the data track have been unused regions. According to the present invention, these conventionally unused regions are effectively used by forming on said regions a magnetic pattern for performing the tracking servo operation.

As to the magnetic pattern bearing the servo signals, it can be provided on either a guard band on only one side of one track or guard bands on both sides of one track to make tracking possible. Further, either of the above described configurations can be used in combination with the conventional sector servo method.

The magnetic pattern is provided in a direction that diagonally intersects the track direction of the data track. It is desirable that the magnetic pattern include a plurality of elements disposed at intervals along the track direction.

The magnetic pattern can be formed by use of a magnetic transfer method.

The drive apparatus according to the present invention is a drive apparatus for driving a magnetic recording medium, comprising a magnetic head for recording data on the data track of said magnetic recording medium and playing back said recorded data; further comprising a second magnetic head for detecting the servo signals from the magnetic pattern.

According to the magnetic recording medium of the present invention, a magnetic pattern bearing servo signals is provided on the regions of the guard band adjoining the data regions, which bear the recorded data, of the data track. By this configuration, the conventionally unused regions of the guard band adjoining the data regions are effectively used. Because the servo control can be performed continuously, accurate tracking control can be performed even for a magnetic recording medium having a narrow track of a width of less than 3 μm. Further, the data storage capacity can be increased because, unlike in the servo sector method, the data region is not encroached upon, that is, narrowed by the servo fields.

Further, as described above, it can be thought that, if only the conventional sector servo method is employed, a considerable increase in the number of servo fields is required in order to perform accurate positioning control for cases in which the track width has been made narrower. However, if the magnetic recording medium is provided with a magnetic pattern, which bears servo signals, on the guard band adjoining the data regions between the servo fields in addition to approximately the same number of servo fields as that occurring in the conventional sector servo method so as to not interfere with increasing the data storage capacity of the magnetic recording medium, accurate positioning control can be performed without increasing the number of servo fields, that is, without making the data region narrower.

If the magnetic pattern bearing servo signals is a magnetic pattern that is provided in a direction that diagonally intersects the track direction and includes a plurality of elements dispersed at intervals along said track direction, positioning control utilizing not only the amplitude of the magnetic pattern, but also the frequency, the change in phase, and/or the like can be performed, and an increase in the accuracy of the positioning control can be expected.

The magnetic pattern bearing servo signals can be easily formed by use of a magnetic transfer method. In particular, the magnetic head with which a conventional servo recording apparatus is generally provided has a predetermined width perpendicular to the track direction, and the number of individual elements for forming the magnetic pattern is limited by the shape of the magnetic head, and it has been difficult to change the shape of each individual element. However, according to magnetic transfer methods, because it is easy to form elements of various shapes on a magnetic transfer master medium, a variety of elements and patterns can be used forbearing servo signals. That is to say, the plurality of elements provided in a direction diagonally intersecting the track direction as described above can be formed easily by use of a magnetic transfer method. Further, it is not necessary to take the variation of the width of each magnetic head of the servo recording apparatus into consideration.

Further, because a plurality of magnetic recording mediums can be preformatted in a short time by use of a single master medium, the efficiency in the manufacture of preformatted magnetic recording mediums can be improved.

The drive apparatus according to the present invention is an apparatus for driving the magnetic recording medium of the present invention, which is provided with a magnetic head for recording data on the data track of the magnetic recording medium of the present invention and playing back said recorded data, as well as a second magnetic head for detecting the servo signals borne on the magnetic pattern provided on the guard bands. By this construction, the tracking control of the magnetic recording medium of the present invention can be performed accurately.

BRIEF DESCRIPTION OF THE DRAWINGS

FIGS. 6A, 6B, and 6C illustrate the basic processes of the magnetic transfer method.

DESCRIPTION OF THE PREFERRED EMBODIMENTS

Hereinafter the preferred embodiments of the present invention will be explained with reference to the attached drawings.

Figure 1:
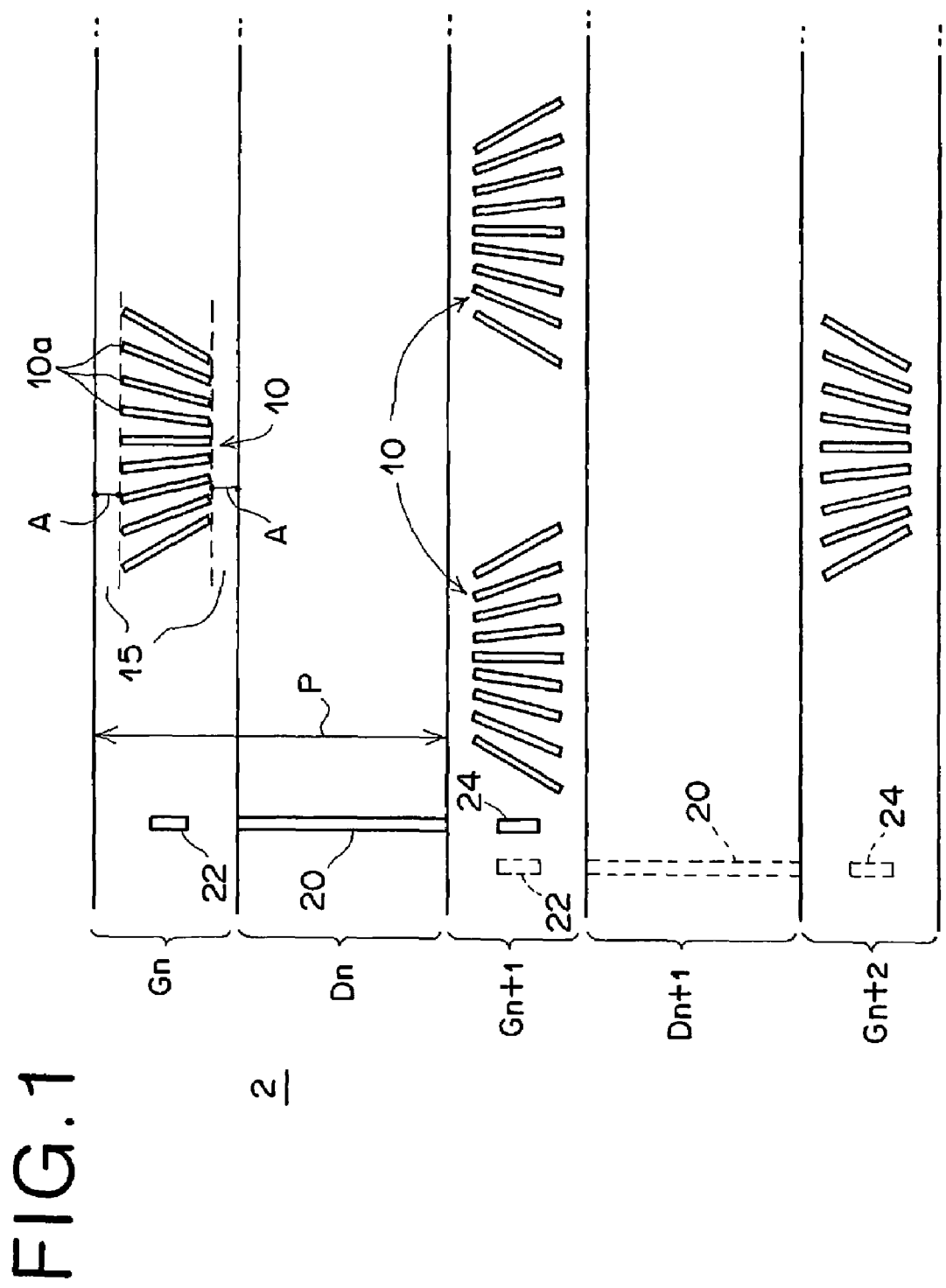
FIG. 1 is an enlarged view of a portion of the magnetic recording medium according to the first embodiment of the present invention.

FIG. 1 is an enlarged view of a portion of the record/playback layer of the magnetic recording medium according to the first embodiment of the present invention. The magnetic recording medium is a disk-shaped magnetic recording medium such as a high-density flexible disk or the like, which is of a configuration comprising a record/playback layer having a magnetic layer formed on a flexible base. Note that in particular, it is desirable that the record/playback layer be a thin film magnetic layer that is coated over the substrate, a thin film metallic magnetic layer, or the like so as to obtain a high recording density.

As shown in FIG. 1, the record/playback layer of the magnetic medium has formed thereon sequential adjoining data tracks D and guard bands G, wherein the guard bands G have recorded thereon a magnetic pattern 10 bearing servo signals. The magnetic pattern 10 can be subjected to a magnetic development process or the like to render the magnetic pattern 10 visible for visual confirmation thereof as required. Note that the combination of the widths of the data track and the guard bands corresponds to the "track pitch." Here, the track pitch is approximately 1-3 μm.

It is desirable that an unused region (dead space) 15 having a predetermined interval A is provided between the magnetic pattern 10 bearing servo signals and the data track D, so that the magnetic head be capable of easily following the track, and the servo signals are not overwritten when recording is performed. The interval A of the dead space 15 depends on an actuator responsive property, a position determining budget, or the like.

The magnetic pattern 10, which bears servo signals, shown in FIG. 1 is formed of a plurality of elements 10a provided in a direction diagonally intersecting the track direction of the data track and which are distributed in a fan shape. According to the present embodiment, a single data track Dn is bordered on the upper side thereof by a guard band Gn, and on the lower side thereof by a guard band Gn+1. The fan shaped magnetic patterns are formed on the guard bands Gn and Gn+1 so that their narrow ends are towards the data track Dn. In this case, the tracking servo operation is performed by detecting the magnetic pattern 10 of each guard band Gn, Gn+1 sandwiching a single data track Dn.

As to the drive apparatus (record/playback apparatus) for a magnetic recording medium such as that described above, a drive apparatus comprising a data magnetic head 20 for scanning the data track D so as to record/playback data thereon, and servo magnetic heads 22, 24 for detecting the servo signals recorded on the guard bands G can be used therefor. Magnetic heads of this type are illustrated by the model drawings thereof shown in FIG. 1.

The data magnetic head 20 is of the same type as that used in a conventional drive apparatus, and is provided with recording-playback head elements: recording is performed by a thin film head element; and playback is performed by an MR, GMR, or other magnetic resistance effect type head element.

On the other hand, the servo magnetic heads 22, 24 are provided with MR head elements manufactured by the same process as that used to manufacture the MR head element used as the playback head element of the data magnetic head. In this manner, if the servo magnetic heads and the data magnetic head are provided with MR head elements that have been manufactured by the same process, the servo magnetic heads and the data magnetic head are mutually capable of easy positioning.

As shown in FIG. 1, the data magnetic head is controlled so as to scan over the data track Dn, and the servo magnetic heads disposed on either side thereof are controlled so as to scan over the guard bands Gn, Gn+1. A position error signal (PES) for controlling the position of the head is generated from the servo play back signal obtained through the continuous detection of the servo signals by the servo magnetic heads 22, 24. In this case, the servo signal from which the PES signal is generated can be switched between that obtained of a portion of the guard band Gn and that obtained of a portion of the guard band Gn+1. Note that when the data magnetic head 20 is to scan the next data track Dn+1, the servo magnetic heads 22, 24 scan the guard bands Gn+1, Gn+2. If the magnetic pattern 10 is fan shaped such as that shown in FIG. 1, that is, if the magnetic pattern is a pattern 10 wherein the intervals of the elements 10*a* are different at different positions in the widthwise direction of the track, the positioning of the magnetic heads can be performed utilizing the fact that the playback frequency of the servo signals differs according to the position of the magnetic head.

Note that the form of the magnetic pattern bearing servo signals is not limited to that shown in FIG. 1. A variety of patterns can be used, and not only the playback frequency, but variations employing the change in phase can also be used. Specific examples of alternative pattern forms are shown in FIGS. 2 and 3.

Figure 2:
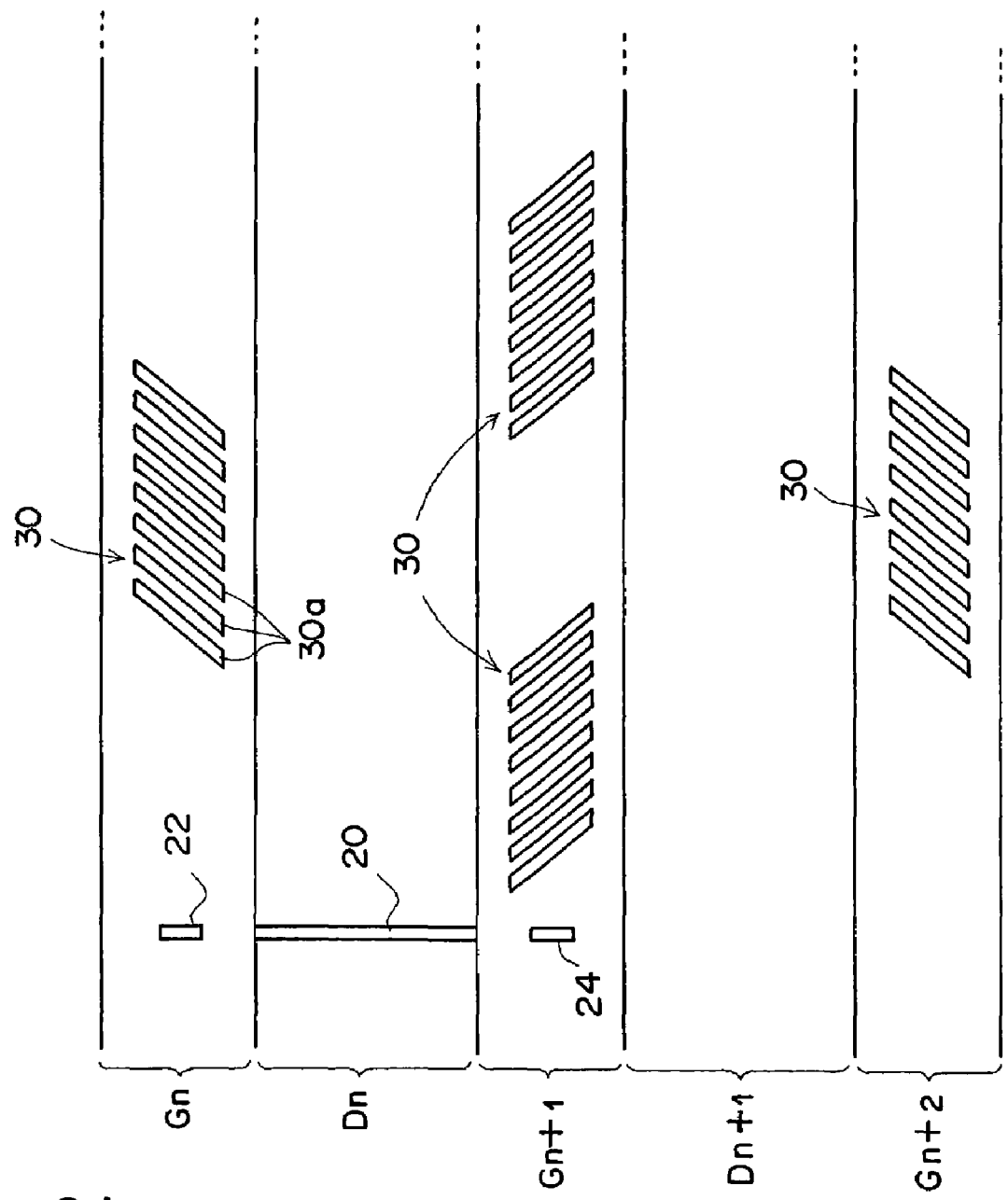
FIG. 2 is an enlarged view of a portion of the magnetic recording medium according to the second embodiment of the present invention.

The second embodiment of a magnetic pattern 30 shown in FIG. 2 is formed of a plurality of unidirectionally slanting elements 30*a* arranged parallel to each other, wherein the elements of the two guard bands Gn, Gn+1 sandwiching the data track Dn extend in a mutually different directions on alternate guard bands.

Figure 3:
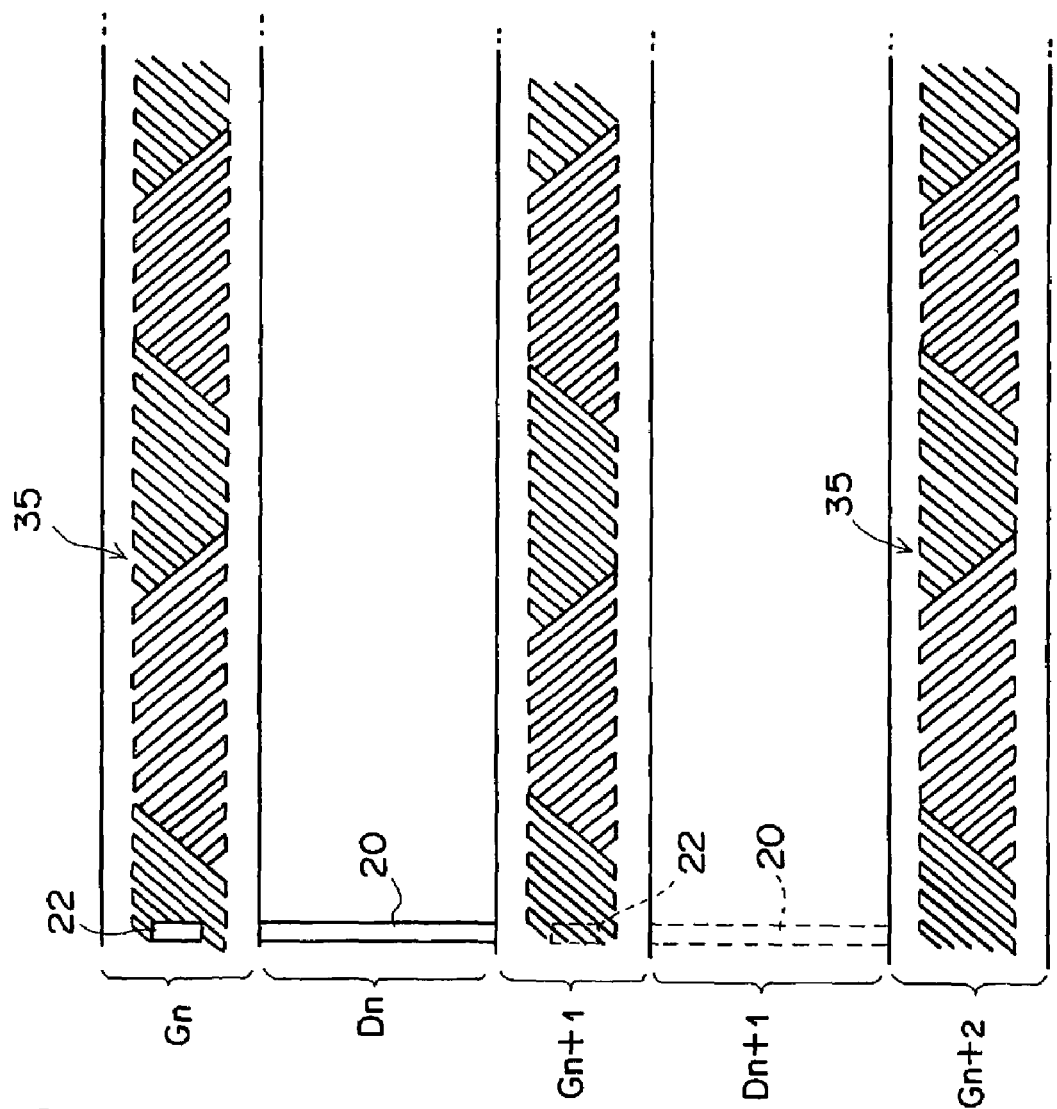
FIG. 3 is an enlarged view of a portion of the magnetic recording medium according to the third embodiment of the present invention.

Further, the third embodiment of a magnetic pattern 35 shown in FIG. 3 is a magnetic pattern 35 in which a combination of the magnetic patterns of the two guard bands Gn, Gn+1 shown in FIG. 2 are provided within a single guard band. If a continuous magnetic pattern is formed within a single guard band in this way, the drive apparatus for driving a magnetic recording medium of this type can be provided with a single servo magnetic head. For example, as shown in FIG. 3, if the drive apparatus is provided with a data magnetic head 20 and a single servo head 22, the servo magnetic head 22 detects the continuous magnetic pattern formed recorded on the guard band Gn, thus enabling the data magnetic head 20 to accurately follow the data track Dn.

Figure 4:
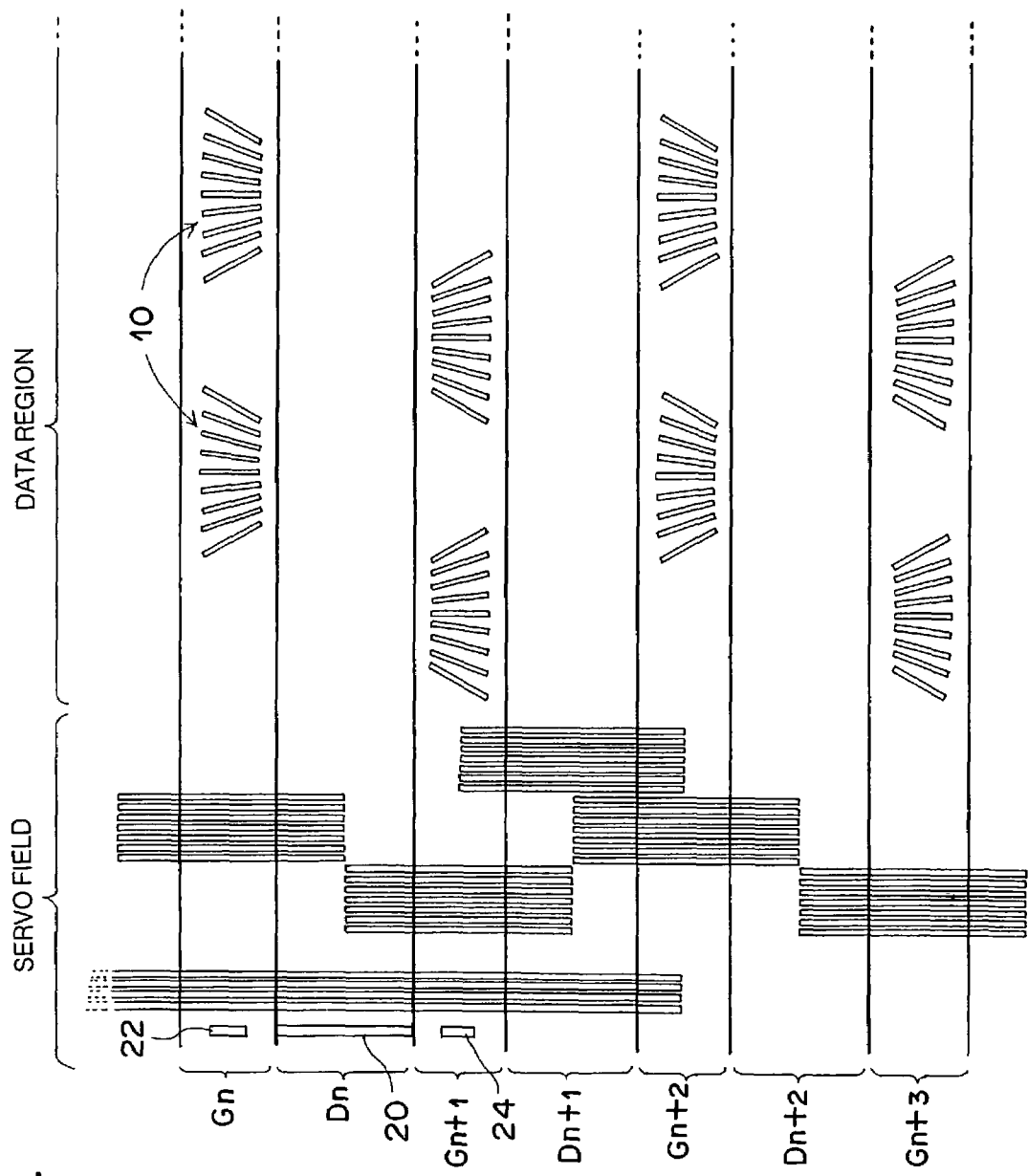
FIG. 4 is an enlarged view of a portion of the magnetic recording medium according to the fourth embodiment of the present invention.

FIG. 4 shows the fourth embodiment of a magnetic recording medium according to the present invention. According to the magnetic recording medium of the present embodiment, in addition to being provided with the servo fields occurring in the conventional sector servo method, a magnetic pattern 10 bearing servo signals is also provided on the guard bands of the data regions.

The drive apparatus for driving the above-described magnetic recording medium can be provided with a data magnetic head and two servo magnetic heads in the same manner as the drive apparatus used for driving the magnetic recording medium of the first embodiment. The detection of the servo signals of the servo fields is performed by use of the data magnetic head 20, which is the conventional practice. After a rough adjustment has been performed by the detection of the servo signals of a servo field, the fine adjustment controls can be performed by the detection of the magnetic pattern 10 of the guard bands by use of the servo heads. The position between the servo elements and the variations in sensitivity can be corrected so that the vicinity of the proximal end of the servo field is on track.

Next, the method of forming the magnetic pattern, which bears servo signals, on the magnetic recording mediums of the present invention shown in FIGS. 1-4 will be explained. The formation of the magnetic pattern is performed by a magnetic transfer method of magnetically transferring data to a magnetic recording medium, which is a slave medium, by use of a master medium. The basic processes of the magnetic transfer method will be explained with reference to FIGS. 5, 6A, 6B, and 6C.

Each of the master mediums 3 and 4 is formed of a hard material as an annular disk. One surface of each of the master mediums is provided with a transfer data bearing surface on which has been formed a micro uneven pattern provided with a magnetic layer on the surfaces of the protrusion portions thereof. These transfer data bearing surfaces are brought into close contact with the recording surfaces 2*d* and 2*e* of the slave medium 2. The master mediums 3 and 4 have an uneven pattern formed thereon corresponding to the lower recording surface 2*d* of the slave medium 2 and the upper recording surface 2*e* of the slave medium 2, respectively. The uneven pattern is formed on the places corresponding to the guard band of the magnetic recording medium, and bears servo signals. For a case in which a magnetic pattern such as that shown in FIG. 1 is to be formed on the magnetic recording medium, a pattern formed of rod shaped protrusion portions distributed in a fan shape can be formed on the portions corresponding to the guard bands.

Figure 5:
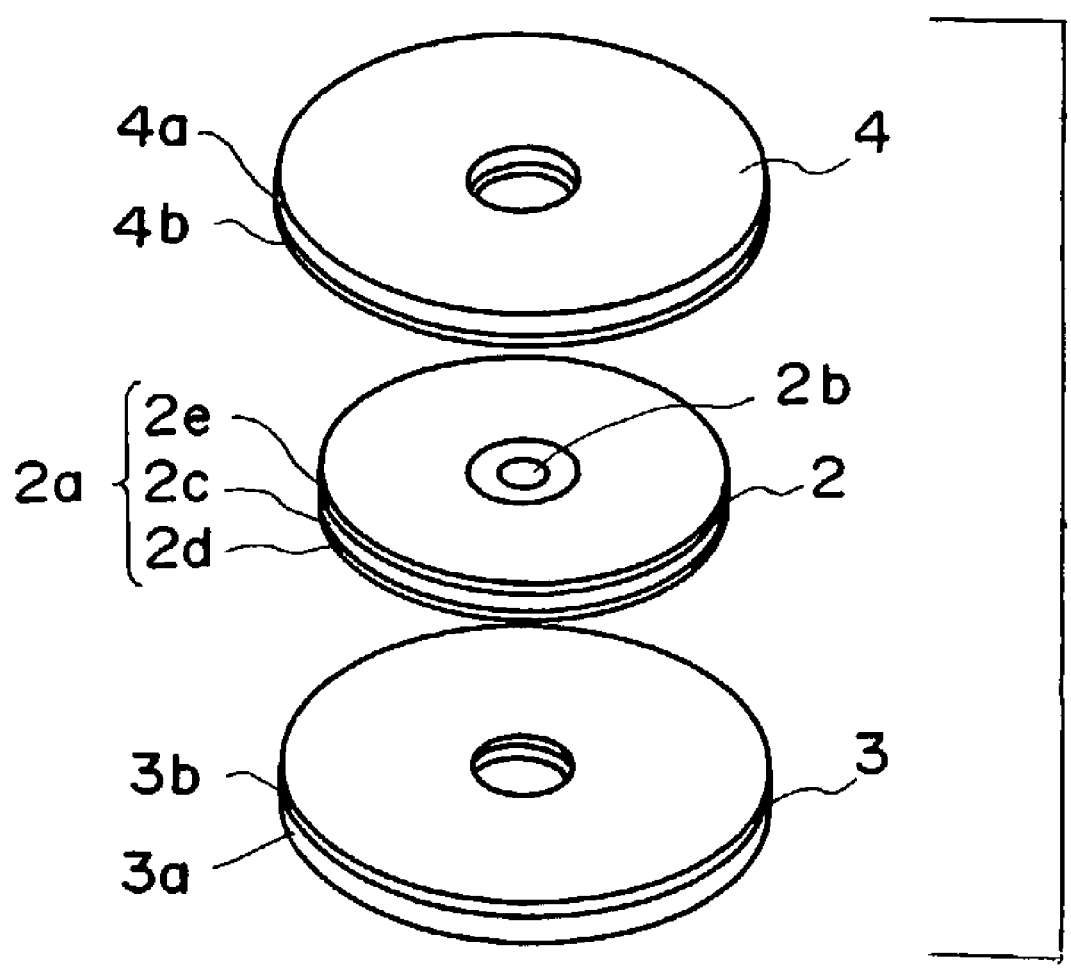
FIG. 5 is a perspective view of a master medium and a slave medium.

Note that the master mediums 3, 4 shown in FIG. 5 comprise respective substrates 3*a* and 4*a* on each of which an uneven pattern is formed, and soft magnetic layers 3*b* and 4*b* formed on the uneven patterns, respectively; however, for cases in which the substrate 3*a* and the substrate 4*a* are formed of a ferromagnetic material such as Ni or the like, it is possible to perform the magnetic transfer by use of only the substrate, and it is therefore not necessarily required that the soft magnetic layers 3b and 4b be provided. However, if a magnetic layer having good magnetic properties is provided, a higher quality magnetic transfer can be performed. Note that for cases in which the substrate is formed of a non-magnetic material, it is necessary that the magnetic layer be provided.

Further, if a protective film such as Diamond-Like Carbon (DLC) or the like is coated on the top layer, this protective film improves the contact durability, enabling the performance of multiple magnetic transfers. Also, a silicon layer applied by a sputtering process or the like can be provided as an under layer of the DLC protective layer.

FIGS. 6A, 6B, and 6C are drawings illustrating the basic processes of the magnetic transfer method utilizing the master medium according to the present invention. FIG. 6A illustrates the process wherein a magnetic field is applied in one direction and the slave medium is initially magnetized with direct current magnetism. FIG. 6B illustrates the process wherein the master medium and the slave medium are brought into close contact and a magnetic field is applied in the direction opposite to that in which the initial magnetic field was applied. FIG. 6C illustrates the state after the magnetic transfer has been performed. Note that in FIGS. 6A, 6B, and 6C, as to the slave medium 2, only the lower face recording surface 2d thereof is shown.

As shown in FIG. 6A, first, an initial magnetic field Hin is applied to the slave medium 2 in one direction of the track direction, whereby the initial magnetization of the slave medium is effected. Then, as shown in FIG. 6B, the recording surface 2d of the slave medium 2 and the transfer data bearing face of the master medium 3, which comprises the micro uneven pattern formed on the substrate 3a over which the magnetic layer 3b has been coated, are brought into close contact, and a transfer magnetic field Hdu is applied in the track direction of the slave medium 2 opposite the direction in which the initial magnetic field Hin was applied, whereby the magnetic transfer is carried out. As a result, the data (here, servo signals) corresponding to the uneven pattern of the data bearing surface of the master medium 3 is magnetically transferred and recorded on the magnetic record/playback surface 2d of the slave medium 2, as shown in FIG. 6C. Here, an explanation has been given for the lower face recording surface 2d of the slave medium and the lower master medium 3. However, as shown in FIG. 5, the upper face recording surface 2e and the upper master medium 4 are brought into close contact and the magnetic transfer is performed in the same manner. The magnetic transfer to the upper and lower face recording surfaces 2d and 2e of the slave medium 2 can be performed concurrently, or sequentially one face at a time.

Note that as to the initial magnetic field and the transfer magnetic field, it is necessary that a value therefor be determined based on a consideration of the coercive magnetic force of the slave medium 2, the relative magnetic permeability of the master and slave mediums, and the like.

It has been difficult to accurately provide a magnetic pattern 10 as that shown in FIG. 1, wherein the elements 10a are formed in the direction intersecting the track direction (the direction in which the head moves), by use of conventional servo writing means. However, by using a magnetic transfer as in the present embodiment, a variety of magnetic patterns can be easily formed, a variety of magnetic patterns can be used to bear servo signals, and further, elements of a variety of shapes can be used to form the magnetic pattern.

What is claimed is:

1. A magnetic disk having a magnetic pattern recorded thereon, the magnetic disk comprising:
   a plurality of data tracks;
   a plurality of guard bands; and
   servo signals;
   wherein the data tracks and the guard bands are alternately provided in the radial direction of the disk and the guard bands are adjacent to on both sides of each of the plurality of data tracks; and
   the magnetic pattern comprises servo signals being recorded in the guard bands throughout the entire circumference thereof,
   wherein each servo signal comprises:
   at least one center element substantially perpendicular to a track direction; and
   a plurality of elements adjacent to the at least one center element arranged at increasing angles away from parallel to the at least one center element,
   wherein the angles between the at least one center element and the adjacent elements increase for adjacent elements positioned further from the at least one center element.

2. The magnetic disk as defined in claim 1, wherein said magnetic pattern is formed by magnetic transfer.

3. An apparatus for recording to and playing back from the magnetic disk as defined in claim 2, comprising:
   a magnetic head which records data on at least one of the plurality of data tracks of said magnetic disk and plays back said recorded data; and
   a second magnetic head for detecting the servo signals from the magnetic pattern.

4. The magnetic disk as defined in claim 1, wherein said magnetic pattern is provided in a direction that diagonally intersects the track direction of the data tracks, and includes a plurality of elements disposed at intervals along said track direction.

5. The magnetic disk as defined in claim 4, wherein said magnetic pattern is formed by magnetic transfer.

6. An apparatus for recording to and playing back from the magnetic disk as defined in claim 5, comprising:
   a magnetic head which records data on at least one of the plurality of data tracks of said magnetic disk and plays back said recorded data; and
   a second magnetic head for detecting the servo signals from the magnetic pattern.

7. An apparatus for recording to and playing back from the magnetic disk as defined in claim 4, comprising:
   a magnetic head which records data on at least one of the plurality of data tracks of said magnetic disk and plays back said recorded data; and
   a second magnetic head for detecting the servo signals from the magnetic pattern.

8. An apparatus for recording to and playing back from the magnetic disk defined in claim 1, comprising:
   a magnetic head which records data on at least one of the plurality of data tracks of said magnetic disk and plays back said recorded data; and
   a second magnetic head for detecting the servo signals from the magnetic pattern.

9. The magnetic disk of claim 1, wherein the radial direction comprises a direction corresponding to a direction from a center of the disk towards an outer edge of the disk.

10. The magnetic disk of claim 1, wherein the magnetic pattern comprising said servo signals is formed in said guard bands only when said magnetic disk is manufactured.

11. A magnetic recording medium comprising:
at least one data track operable to store magnetically recorded data;
at least one guard band respectively corresponding to said at least one data track; and
a magnetic servo pattern magnetically storing servo signals operable to maintain alignment of a magnetic head to said at least one data track when the magnetically recorded data is read,
wherein said magnetic servo pattern is formed in said at least one guard band, wherein said magnetic servo pattern comprises at least one center element substantially perpendicular to a track direction, and a plurality of elements adjacent to the at least one center element arranged at increasing angles away from parallel to the at least one center element,
wherein the angles between the at least one center element and the adjacent elements increase for adjacent elements positioned further from the at least one center element.

12. A magnetic recording medium as claimed in claim 11, wherein said magnetic servo pattern comprises a plurality of magnetic elements centered within a respective guard band.

13. The magnetic recording medium of claim 11, wherein the magnetic servo pattern is formed in said at least one guard band only when said magnetic recording medium is manufactured.

* * * * *